US006952643B2

(12) United States Patent
Matsuoka et al.

(10) Patent No.: US 6,952,643 B2
(45) Date of Patent: Oct. 4, 2005

(54) ROAD TRAFFIC INFORMATION OUTPUT APPARATUS

(75) Inventors: Yoji Matsuoka, Zama (JP); Toru Saito, Yamato (JP); Hideo Suzuki, Hadano (JP); Takeshi Horie, Fujisawa (JP)

(73) Assignee: Xanavi Informatics Corporation, Zama (JP)

( * ) Notice: Subject to any disclaimer, the term of this patent is extended or adjusted under 35 U.S.C. 154(b) by 0 days.

(21) Appl. No.: 10/262,902

(22) Filed: Oct. 3, 2002

(65) Prior Publication Data

US 2003/0028312 A1 Feb. 6, 2003

Related U.S. Application Data

(63) Continuation of application No. 09/603,193, filed on Jun. 26, 2000, now abandoned.

(30) Foreign Application Priority Data

Jun. 25, 1999 (JP) .......................................... 11-180075
Mar. 29, 2000 (JP) .......................................... 2000-90381

(51) Int. Cl.[7] .......................... G06F 19/00; G06G 7/70; G01C 21/00; G08G 1/123

(52) U.S. Cl. ....................... 701/117; 701/208; 701/209; 701/210; 340/995.13; 340/995.12

(58) Field of Search ....................... 340/995.12, 995.13, 340/901, 903, 905; 455/456.6, 456.3, 414.3, 186.1; 701/117, 118, 119, 208, 209–210, 211

(56) References Cited

U.S. PATENT DOCUMENTS 5,748,107 A 5/1998 Kersken et al. ............. 340/905
5,911,773 A * 6/1999 Mutsuga et al. ............ 701/200
5,933,100 A * 8/1999 Golding ................. 340/995.13
5,991,610 A * 11/1999 Ruhl et al. ............... 455/186.1
6,070,123 A * 5/2000 Beyer et al. ................ 701/209
6,101,443 A * 8/2000 Kato et al. .................. 701/210
6,111,539 A * 8/2000 Mannings et al. ..... 342/357.09
6,128,571 A * 10/2000 Ito et al. ..................... 701/201
6,169,956 B1 * 1/2001 Morimoto et al. .......... 701/209
6,243,646 B1 * 6/2001 Ozaki et al. ................ 701/211
6,255,963 B1 * 7/2001 Heimann et al. ........... 340/905
6,269,303 B1 * 7/2001 Watanabe et al. ........... 701/209
6,405,132 B1 * 6/2002 Breed et al. ................ 701/301
6,493,557 B1 * 12/2002 Yoshida ................... 455/456.3
6,694,255 B1 * 2/2004 Kainuma et al. ........... 701/209

FOREIGN PATENT DOCUMENTS

| | | |
|---|---|---|
| DE | 43 22 288 | 1/1995 |
| DE | 44 45 582 | 3/1996 |
| DE | 197 50 775 | 6/1998 |
| EP | 0 829 837 | 3/1998 |
| JP | 7-7480 | 1/1995 |
| JP | 8-191255 | 7/1996 |
| JP | 9-50591 | 2/1997 |
| JP | 10-170285 | 6/1998 |

* cited by examiner

*Primary Examiner*—Thomas G. Black
*Assistant Examiner*—Brian J. Broadhead
(74) *Attorney, Agent, or Firm*—Crowell & Moring LLP

(57) ABSTRACT

A road traffic information output apparatus includes: a road traffic information obtaining device that obtains road traffic information; a decision-making device that determines in advance a specific area for which road traffic information will need to be output; and a control device that implements control to output road traffic information that has been obtained by the road traffic information obtaining device for the specific area determined in advance, when the road traffic information for the specific area determined in advance by the decision-making device is required.

6 Claims, 15 Drawing Sheets

306

ROAD TRAFFIC INFORMATION OUTPUT APPARATUS

This application is a continuation of application Ser. No. 09/603,193, filed Jun. 26 2000 now abandoned.

INCORPORATION BY REFERENCE

The disclosures of the following priority applications are herein incorporated by reference:
Japanese Patent Application No. 11-180075, filed Jun. 25, 1999; and
Japanese Patent Application No. 2000-90381, filed Mar. 29, 2000.

BACKGROUND OF THE INVENTION

1. Field of the Invention

The present invention relates to a road traffic information output apparatus that outputs road traffic information.

2. Description of the Related Art

Car navigation systems in the known art achieve functions of displaying a road map around the current vehicle position, calculating a recommended route from a start point to a destination, providing route guidance based upon the calculated recommended route and the like. In addition, a road traffic information communication system (VICS) provides road traffic information through FM multiplex broadcast, light beacons and radio wave beacons. The VICS is maintained and managed by the Vehicular Traffic Information Communication System Center (VICS Center). The road traffic information provided by VICS (hereafter referred to as VICS information) includes traffic jam information, traffic control information, parking lot information, service area information and parking area information.

A car navigation apparatus receives VICS information and provides the driver with road traffic information in the form of VICS information. For instance, it may display a road map in the vicinity of the current vehicle position and provide visual traffic jam information by indicating a jammed road in red, a crowded road in yellow and a road which is neither jammed nor crowded in green.

However, when the driver wishes to view traffic jam information corresponding to a position distant from the current vehicle position such as the vicinity of the destination with a car navigation apparatus in the prior art, he must scroll the display from the current vehicle position to the destination. The process of reaching the destination through such a scroll operation is very troublesome. In addition, since smooth scrolling is prohibited while the vehicle is moving, the operation becomes even more difficult. There is another problem in that since the VICS information obtained from FM multiplex broadcast only provides information on traffic information within the prefecture in which the vehicle is currently located, VICS information for the destination which is in another prefecture cannot be obtained or displayed even through a scroll operation.

In addition, there is a problem with FM multiplex broadcast in that continuity in road traffic information display ranging over areas covered by a plurality of FM stations cannot be achieved.

SUMMARY OF THE INVENTION

An object of the present invention is to provide a road traffic information output apparatus that is capable of outputting road traffic information corresponding to different areas easily, promptly and smoothly. More specifically, the present invention aims to provide a road traffic information output apparatus capable of promptly outputting road traffic information for a pre-registered location through a simple operation and to provide a road traffic information output apparatus capable of continuously displaying necessary road traffic information without interruption. Another object of the present invention is to provide a recording medium that records a program used to control the road traffic information output apparatus and to provide a data signal that transmits the program.

In order to attain the above object, the first road traffic information output apparatus according to the present invention, comprises: a road traffic information obtaining device that obtains road traffic information; a decision-making device that determines in advance a specific area for which road traffic information will need to be output; and a control device that implements control to output road traffic information that has been obtained by the road traffic information obtaining device for the specific area determined in advance, when the road traffic information for the specific area determined in advance by the decision-making device is required.

In this first road traffic information output apparatus, it is preferred that the road traffic information obtaining device has a radio broadcast reception device; and road traffic information is transmitted as digital data through radio broadcast.

Also, it is preferred that the decision-making device has a location registration device to register a location in advance for which road traffic information is to be output; the road traffic information output apparatus further comprises an instruction device that issues an instruction to output road traffic information for the registered location; and the control device implements control to output road traffic information for an area around the registered location obtained by the road traffic information obtaining device, when the instruction device issues an instruction to output road traffic information corresponding to the registered location. In this case, it is preferred that the road traffic information obtaining device has a radio broadcast reception device; and road traffic information is transmitted as digital data through radio broadcast. In this case, it is preferred that the road traffic information obtaining device further has an information provider system connection device that can be connected to an information provider system that provides information through a digital mobile telephone system, and receives road traffic information by connecting to the information provider system if road traffic information cannot be received by the radio broadcast reception device.

The second road traffic information output apparatus is achieved by that in the first road traffic information output apparatus, preferably, the road traffic information obtaining device obtains road traffic information for individual specific areas which is transmitted in correspondence to the individual specific areas; and the control device controls the road traffic information obtaining device so as to obtain in advance road traffic information for the specific area determined in advance by the decision-making device before the road traffic information corresponding to the specific area is required.

The third road traffic information output apparatus that receives and outputs road traffic information for individual specific areas which is transmitted as digital data from radio stations designated for the individual specific areas through radio broadcast, comprises: a tuning switching device that switches radio station tuning; a road traffic information obtaining device that obtains road traffic information for an area corresponding to a radio station that is currently tuned in; an output device that outputs the road traffic information obtained by the road traffic information obtaining device; and a decision-making device that determines in advance a specific area for which road traffic information will be required, wherein the tuning switching device switches tuning to a radio station corresponding to the specific area determined by the decision-making device.

In the third road traffic information output apparatus, it is preferred that the road traffic information obtaining device further has an information provider system connection device that can be connected to an information provider system that provides information through a digital mobile telephone system, and receives road traffic information by connecting to the information provider system if road traffic information cannot be received from the radio station.

In the above second or third road traffic information output apparatuses, it is preferred that the road traffic information output apparatuses further comprises: map information used to provide information related to traveling of a vehicle; a current position detection device that detects a current position of the vehicle; and a control device that controls provision of the information related to traveling of the vehicle based upon the map information and the current position detected by the current position detection device, and the decision-making device determines an area in the map information within a specific range from the current position of the vehicle detected by the current vehicle detection device as a specific area for which road traffic information will be required.

In the above second or third road traffic information output apparatus, it is preferred that the road traffic information output apparatus further comprises: map information used to provide information related to traveling of a vehicle; a current position detection device that detects a current position of the vehicle; and a control device that controls provision of the information related to traveling of the vehicle based upon the map information and the current position detected by the current position detection device, and the decision-making device determines an area close to a zone boundary in the map information as a specific area for which road traffic information will be required, when zone boundary data are present within a specific range from the current position of the vehicle detected by the current position detection device.

In the above second or third road traffic information output apparatus, it is preferred that the road traffic information output apparatus further comprises: map information used to provide information related to traveling of a vehicle; a current position detection device that detects a current position of the vehicle; and a control device that controls provision of the information related to traveling of the vehicle based upon the map information and the current position detected by the current position detection device, and: the control device controls the provision of the information related to traveling of the vehicle based upon results of a route search; and the decision-making device determines an area that contains a route present within a specific range from the current position of the vehicle detected by the current position detection device on a route resulting from the route search as a specific area for which road traffic information will be required. In this case, it is preferred that the specific range represents an entire route resulting from the route search.

In the above second or third road traffic information output apparatus, it is preferred that the road traffic information output apparatus further comprises: map information used to provide information related to traveling of the vehicle; and an output device that outputs road traffic information obtained by the road traffic information obtaining device, and: the output apparatus outputs road traffic information so that road traffic information is displayed together with a map display achieved based upon the map information at a display device; and the decision-making device determines an area on the map information within a specific range from a specific position on a map currently displayed at the display device as a specific area for which road traffic information will be required. In this case, it is preferred that the road traffic information output apparatus further comprises an input device that is operated by a user to scroll map display at the display device, and the decision-making device determines an area on the map information within a specific range from a specific position on a map currently displayed at the display device as a specific area for which road traffic information will be required, even when the map display is changing at the display device in response to scroll instructions by the user.

In the above road traffic information output apparatuses, it is preferred that the radio broadcast is FM multiplex broadcast.

A recording medium according to the present invention records a program for a road traffic information output apparatus. The program comprises: a first step in which road traffic information is obtained; a second step in which a location for which a user wishes to output road traffic information is registered in advance; a third step in which road traffic information for the registered location is output; and a fourth step in which control is implemented to output road traffic information corresponding to an area around the registered location obtained in the first step when an instruction is issued to output road traffic information for the registered location in the third step.

Another recording medium according to the present invention records a program for a road traffic information output apparatus. The program comprises: a first step in which a decision is made in advance on an area for which road traffic information will need to be output among sets of road traffic information transmitted in correspondence to individual specific areas; a second step in which road traffic information for the area determined in advance in the first step is obtained in advance before road traffic information corresponding to the area is required; and a third step in which road traffic information corresponding to the area obtained in the second step is output when road traffic information for the area needs to be output.

A data signal according to the present invention transmitted through a communication line comprises a program for a road traffic information output apparatus. The program comprises: a first step in which road traffic information is obtained; a second step in which a location for which a user wishes to output road traffic information is registered in advance; a third step in which road traffic information for the registered location is output; and a fourth step in which control is implemented to output road traffic information corresponding to an area around the registered location obtained in the first step when an instruction is issued to output the road traffic information for the registered location in the third step.

Another data signal according to the present invention transmitted through a communication line comprises a program for a road traffic information output apparatus. The program comprises: a first step in which a decision is made in advance on an area for which road traffic information will need to be output among sets of road traffic information transmitted in correspondence to individual specific areas; a second step in which road traffic information for the area determined in advance in the first step is obtained in advance before road traffic information corresponding to the area is required; and a third step in which road traffic information corresponding to the area obtained in the second step is output when road traffic information for the area needs to be output.

DESCRIPTION OF THE PREFERRED EMBODIMENTS

First Embodiment

Figure 1:
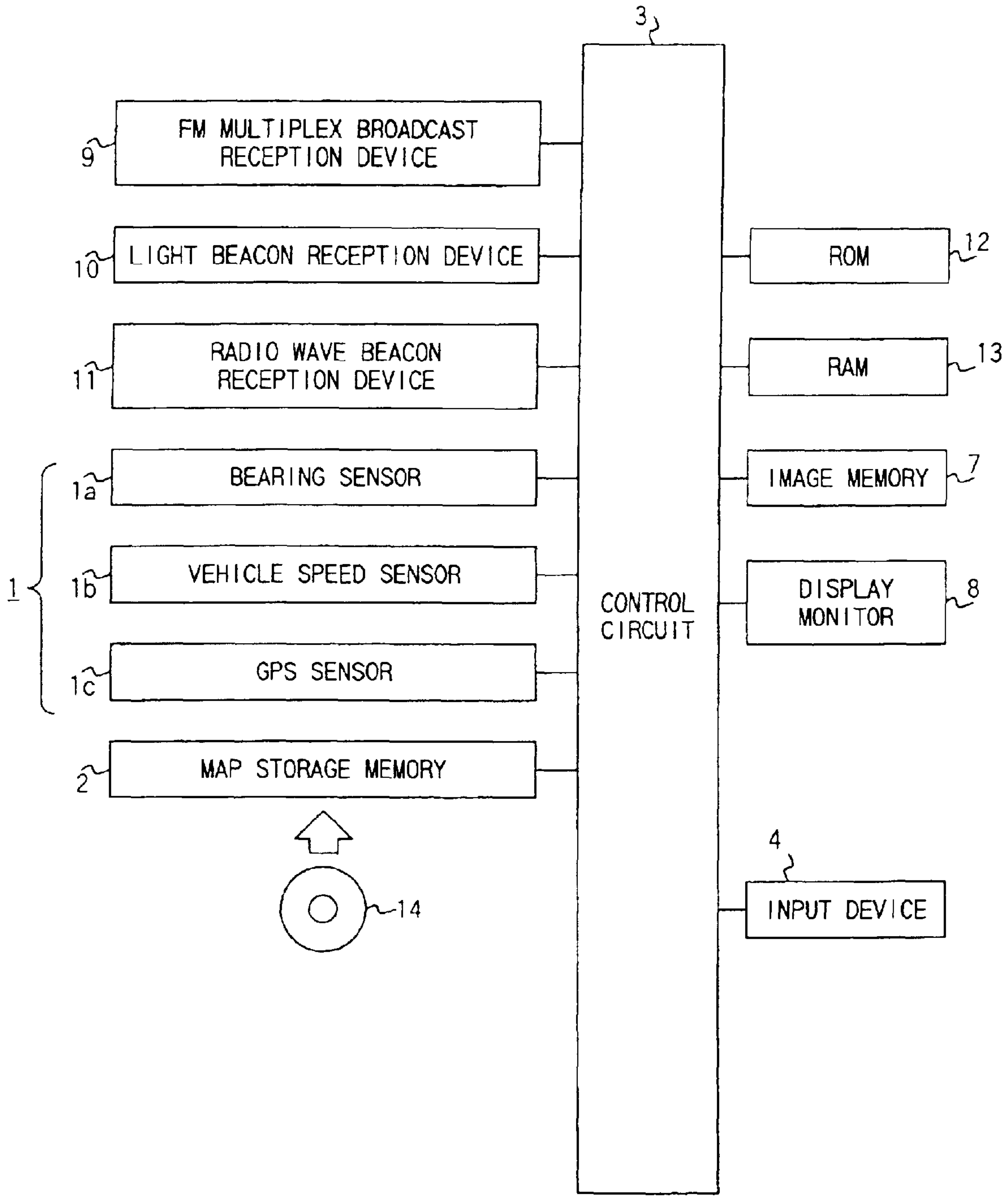
FIG. 1 shows a block diagram of the car navigation apparatus in an embodiment of the present invention.

FIG. 1 is a block diagram of the car navigation apparatus in an embodiment of the present invention. The car navigation apparatus achieves functions of providing information related to traveling of the vehicle, i.e., functions of displaying a road map around the current vehicle position, calculating a recommended route from the start point to a destination, providing route guidance based upon the calculated recommended route and the like. Specifically, it is a navigation and road guidance apparatus.

In FIG. 1, reference number 1 indicates a current position detection device that detects the current position of the vehicle and may comprise a bearing sensor 1*a* for detecting the bearing of the vehicle, a vehicle speed sensor 1*b* for detecting the vehicle speed, a GPS sensor 1*c* for detecting a GPS signal from a GPS (Global Positioning System) satellite. Reference number 2 indicates a map storage memory in which road map data are stored, comprising, a CD-ROM 14 constituting a recording medium for storing the road map data and a read device that reads the road map data. The recording medium does not have to be constituted of a CD-ROM, and another type of recording medium such as magnetic tape or a DVD may be used instead.

Reference number 3 indicates a control circuit that controls the entire apparatus and comprises a microprocessor and its peripheral circuits. The control circuit 3 engages in various types of control to be detailed later as it executes a control program stored in the ROM 12 by using a RAM 13 as a work area. Reference number 4 indicates an input device having various switches through which a destination and the like for the vehicle are input. It includes a joystick used to control cursor movement and screen scrolling. It is to be noted that the input device 4 may be realized as a remote control system. In addition, touch panel switches may be provided within the screen.

Reference number 7 indicates an image memory in which image data to be displayed at a display monitor 8 to be described later, are stored, and the image data are prepared by using roadmap drawing data, the VICS information provided in the form of graphic data and the like. The image data stored in the image memory 7 are read out as necessary and are displayed at the display monitor 8. The control circuit 3 functions as an output device that outputs display signals to the display monitor 8.

Reference numbers 9, 10 and 11 respectively indicate an FM multiplex broadcast reception device, a light beacon reception device and a radio wave beacon reception device, which receive road traffic information (hereafter referred to as VICS information) transmitted through FM multiplex broadcast waves, light beacons and radio wave beacons. The VICS information is transmitted as programmable digital data.

The VICS information includes traffic jam information, traffic control information, parking lot information, service area information and parking area information. In addition, the traffic control information includes lane control information, expressway lamp control information and interchange control information. The traffic jam information is provided by dividing the road into advancing and returning directions and by indicating a jammed state in red, a crowded state in yellow and a light-traffic state in green.

Next, an operation performed to pre-register (register in advance) a location for which the driver wishes to obtain VICS information and an operation performed to display the VICS information corresponding to the registered location are explained.

FIGS. 2A through 2D show the operation performed to pre-register a location for which the user wishes to obtain VICS information in the car navigation apparatus. The control circuit 3 displays a road map at the display monitor 8 based upon the data in the map storage memory 2 and also displays menus and the like for selecting various functions. The user is able to indicate desired functions to the control circuit 3 by selecting the various menu items through the input device 4.

Figure 2A:
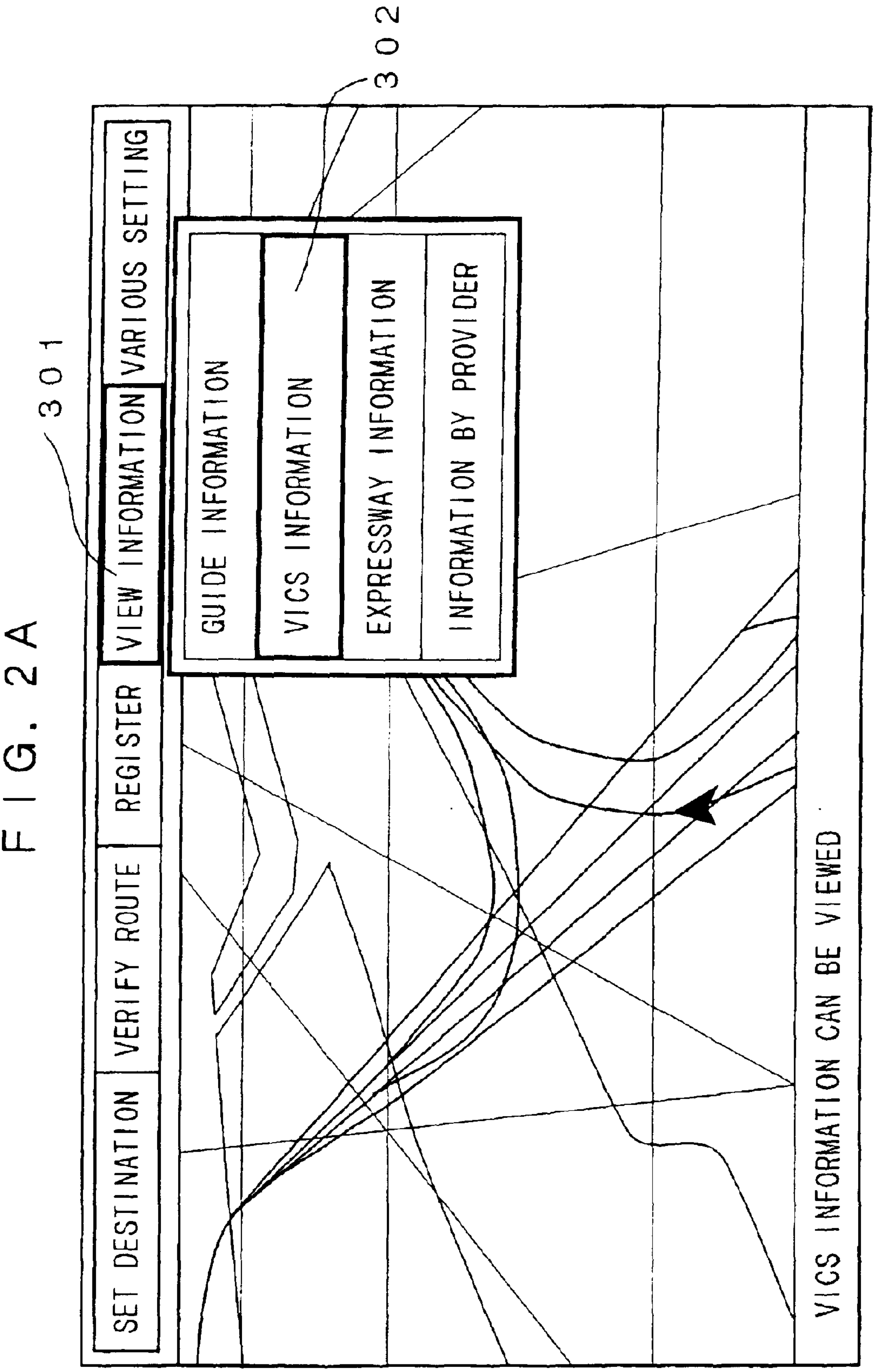
FIGS. 2A through 2D illustrate an operation performed at the car navigation apparatus to pre-register a location for which the user wishes to obtain VICS information.
Figure 2B:
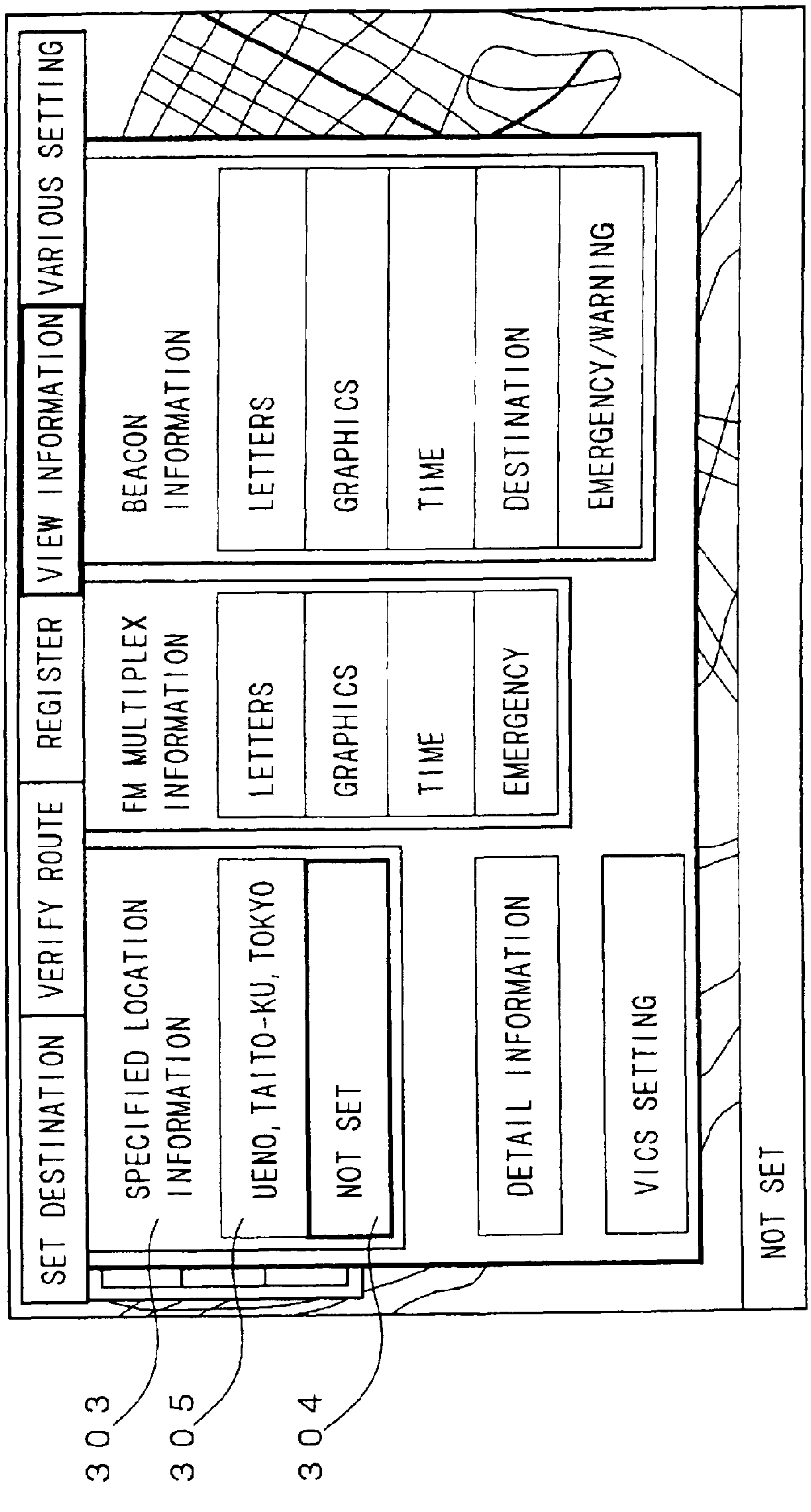

FIG. 2A shows "View Information" 301 selected from the menu screen and "VICS Information" 302 selected from the pull-down menu through a user operation at the input device 4. When the user issues an "OK" instruction through the input device 4, the control circuit 3 displays the contents shown in FIG. 2B. FIG. 2B shows "Not Set" 304 selected from "Specified Location Information" 303 through further user operation at the input device 4.

Figure 2C:
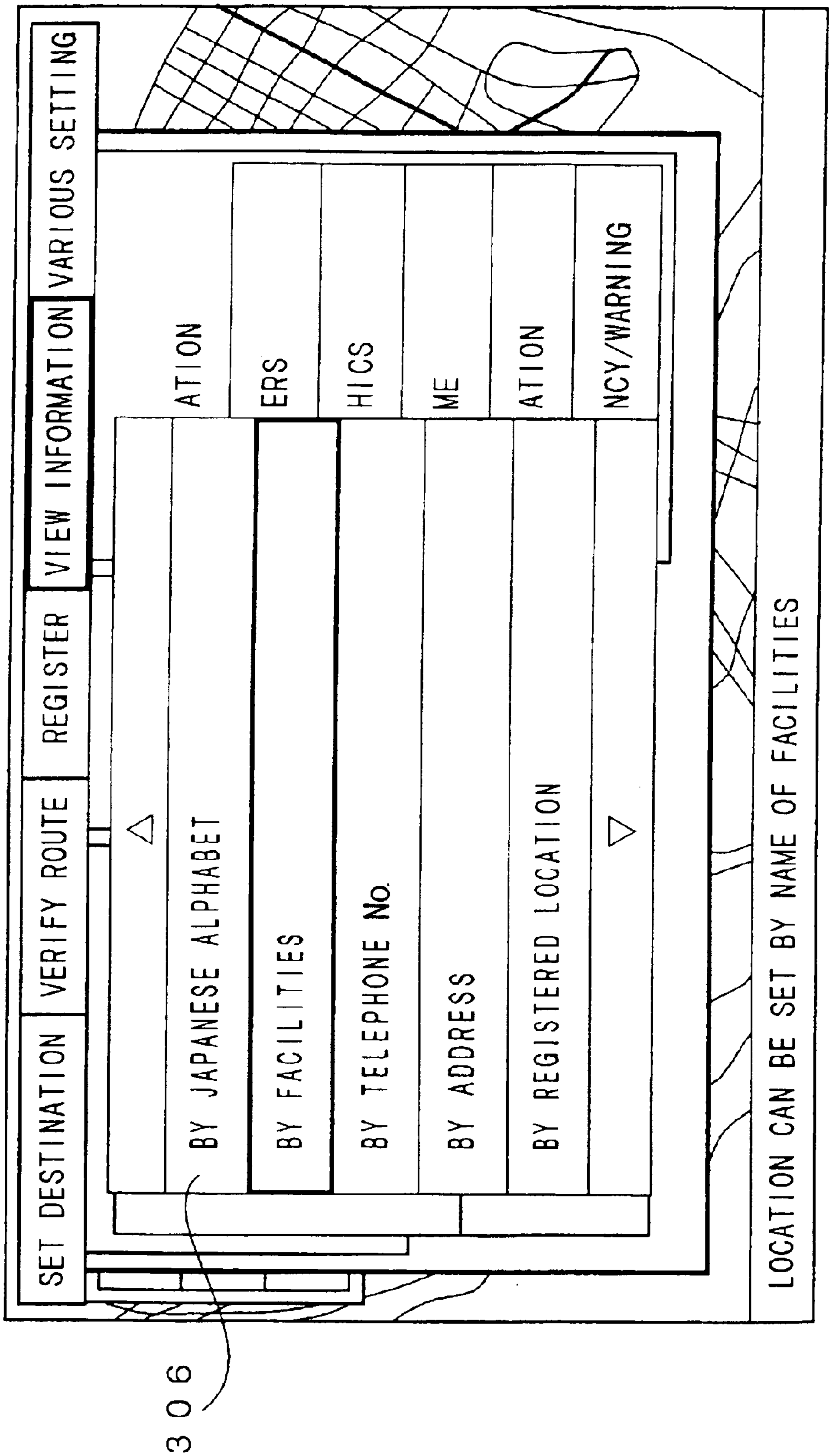

In this embodiment, up to two locations can be specified for registration. In the display shown in FIG. 2B, "Ueno, Taito-ku, Tokyo" 305 has already been specified with another location yet to be specified for registration. When the user selects "Not Set" 304 through the input device 4 while the display in FIG. 2B is up, and issues an "OK" instruction, the control circuit 3 displays the contents shown in FIG. 2C. The display shown in FIG. 2C is a menu screen that enables selection of a specified location setting method.

The location may be set through any of various setting methods. For instance, the location may be entered in the Japanese alphabet (Japanese Syllabary) by selecting "By Japanese Alphabet" 306 or it may be specified on the map (not shown). Alternatively, the location may be entered in the English alphabet. A detailed explanation of these methods is omitted.

Figure 2D:
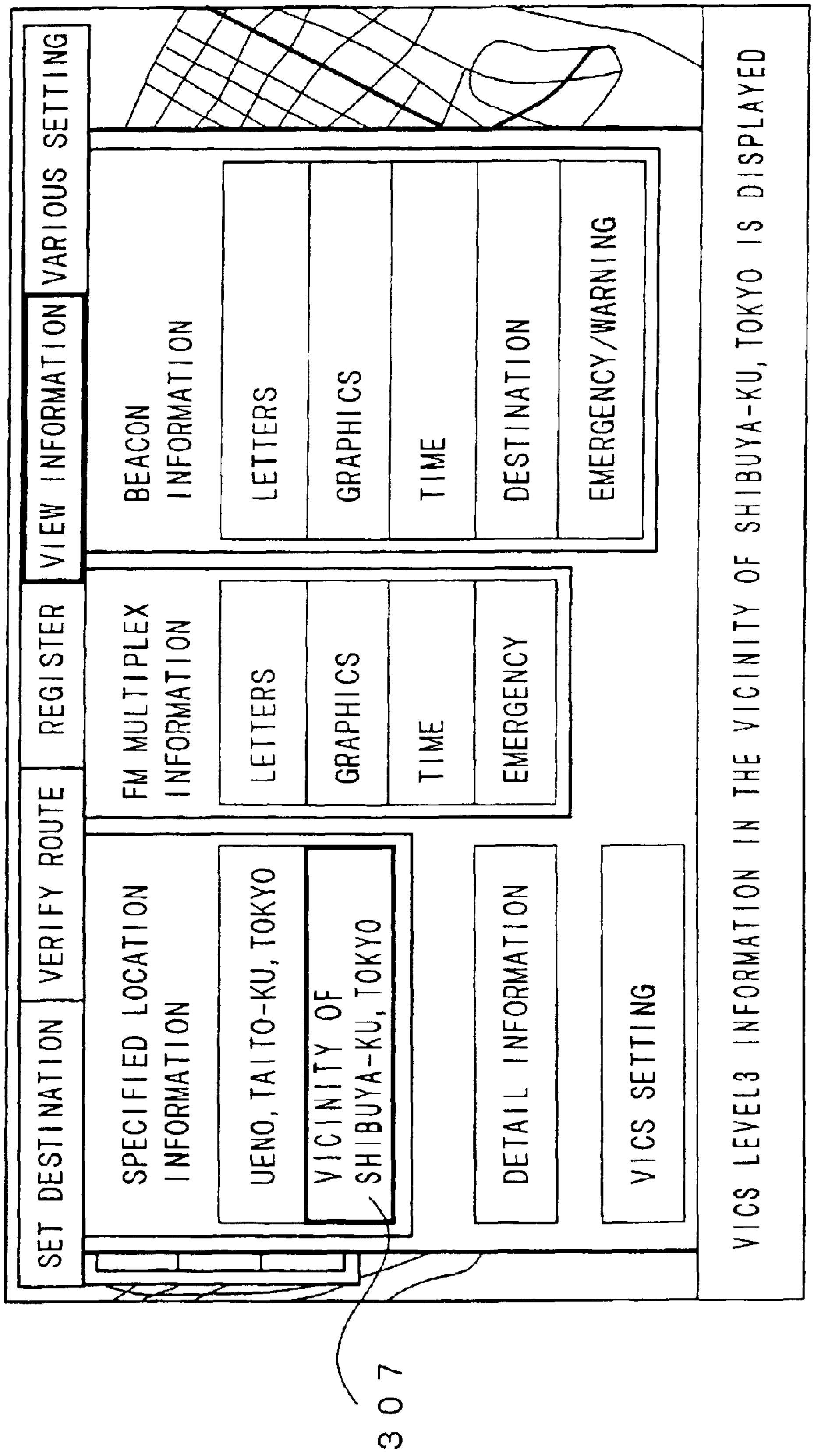

For instance, if "Shibuya" is specified in the Japanese alphabet or the English alphabet, "Vicinity of Shibuya-ku, Tokyo" 307 is set and registered as shown in FIG. 2D.

Figure 3A:
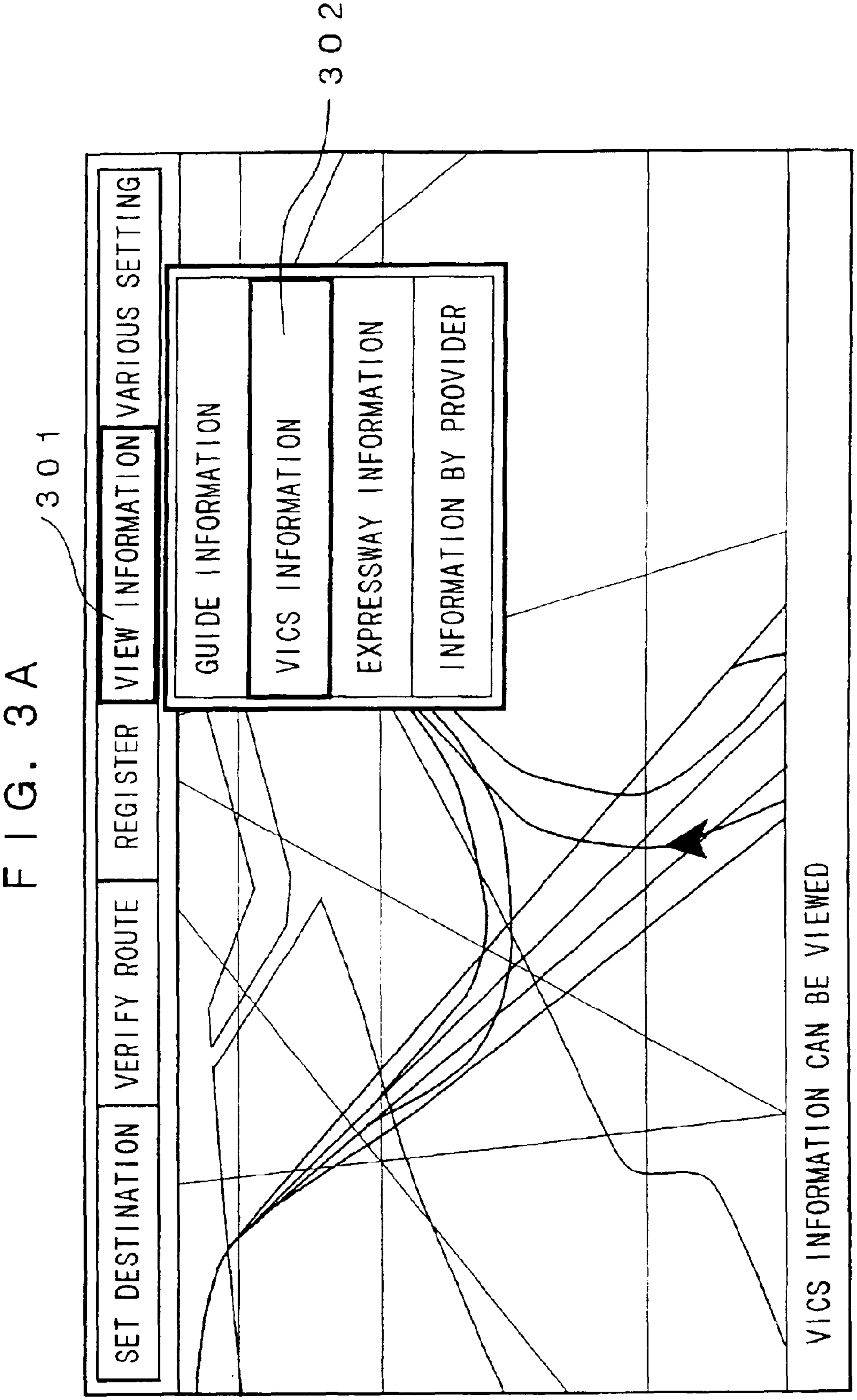
FIGS. 3A through 3C illustrate an operation performed to display the VICS information corresponding to a registered location.
Figure 3B:
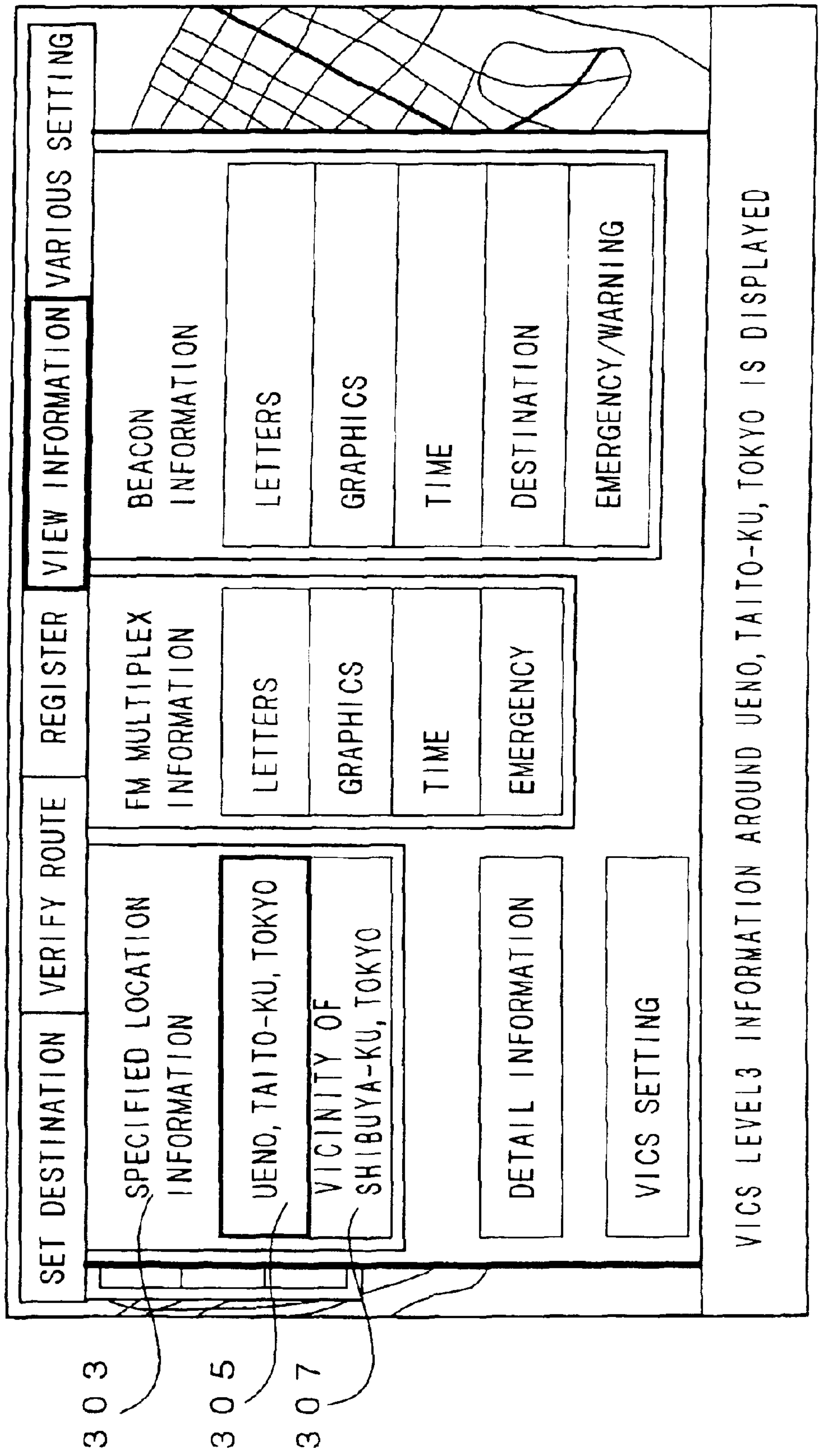

Next, the operation performed to display the VICS information corresponding to the registered location is explained in reference to FIG. 3. FIG. 3A shows "View Information" 301 selected from the menu screen and "VICS Information" 302 selected from the pull-down menu through a user operation at the input device 4, as does FIG. 2A. If the user issues an "OK" instruction through the input device 4 in this state, the control circuit 3 displays the contents shown in FIG. 3B.

Figure 3C:
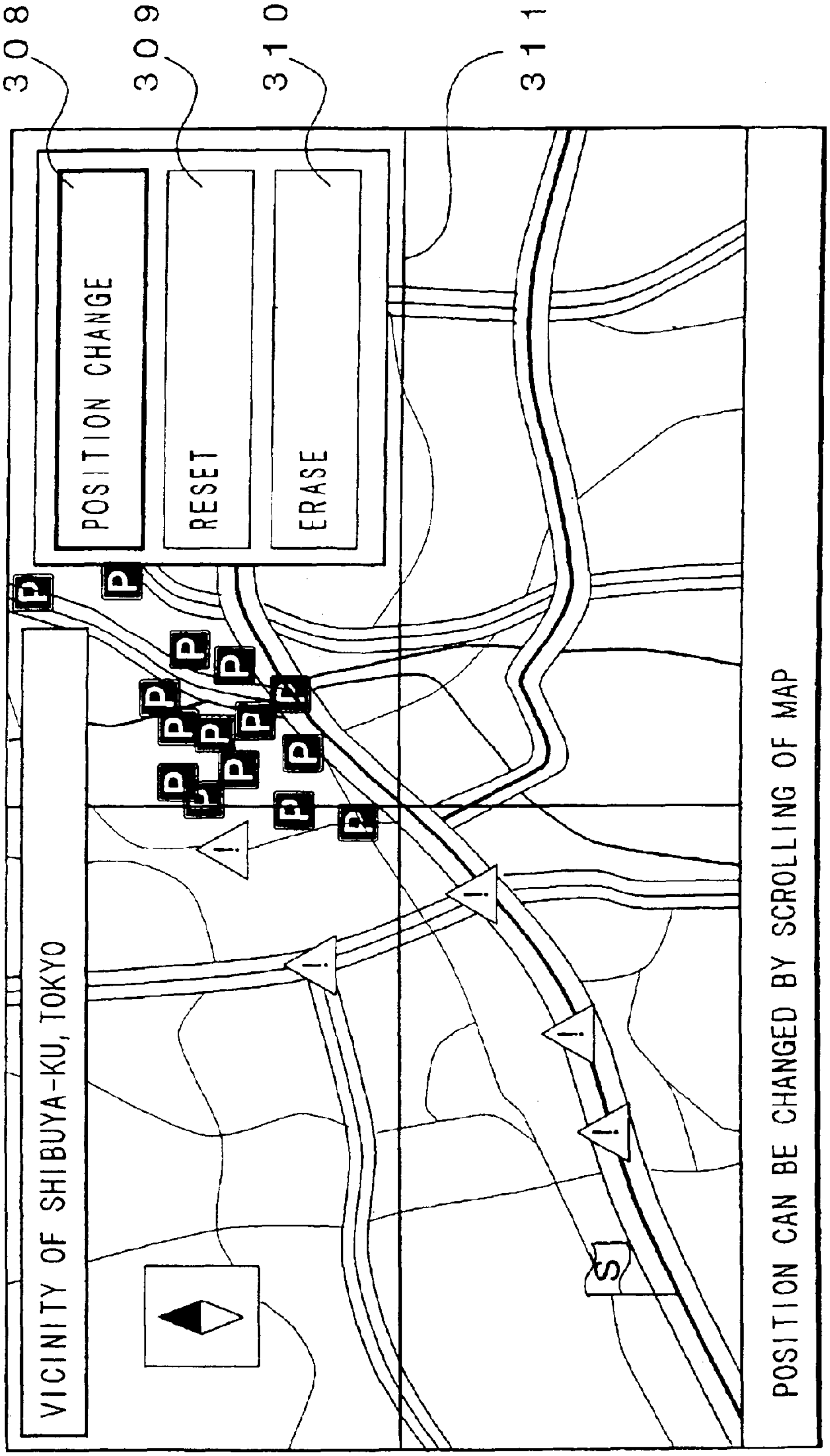

FIG. 3B shows that two locations, i.e., "Ueno, Taito-ku, Tokyo" 305 and "Vicinity of Shibuya-ku, Tokyo" 307 are specified and registered for "Specified Location Information" 303. If the user operates the input device 4 at this point to select "Vicinity of Shibuya-ku, Tokyo" 307 and issues an "OK" on the selection, the control circuit 3 displays the screen shown in FIG. 3C. In FIG. 3C, a road map in the "Vicinity of Shibuya-ku, Tokyo" is displayed and also, the VICS information obtained in correspondence to the "Vicinity of Shibuyaku, Tokyo" is superimposed on the road map display. Although not shown clearly in FIG. 3C, a jammed road, a crowded road and a road with light traffic, for instance, may be indicated in red, yellow and green respectively.

It is to be noted that by selecting "Position Change" 308, "Reset" 309 or "Erase" 310 in FIG. 3C, a registered location can be changed or erased. For instance, if "Position Change" 308 is selected in the display shown in FIG. 3C, the registered location can be changed by moving the cursor 311 with the input device 4. In this case, "Vicinity of Shibuya-ku, Tokyo" 307 is automatically changed to the name of the new location entered through movement of the cursor for registration. If "Reset" 309 is selected, a reset operation from the display shown in FIG. 2C is enabled. If "Erase" 310 is selected, the registration of the "Vicinity of Shibuyaku, Tokyo" 307 is erased.

Next, the control implemented by the control circuit 3 during the operations described in reference to FIGS. 2 and 3 is explained.

Figure 4:
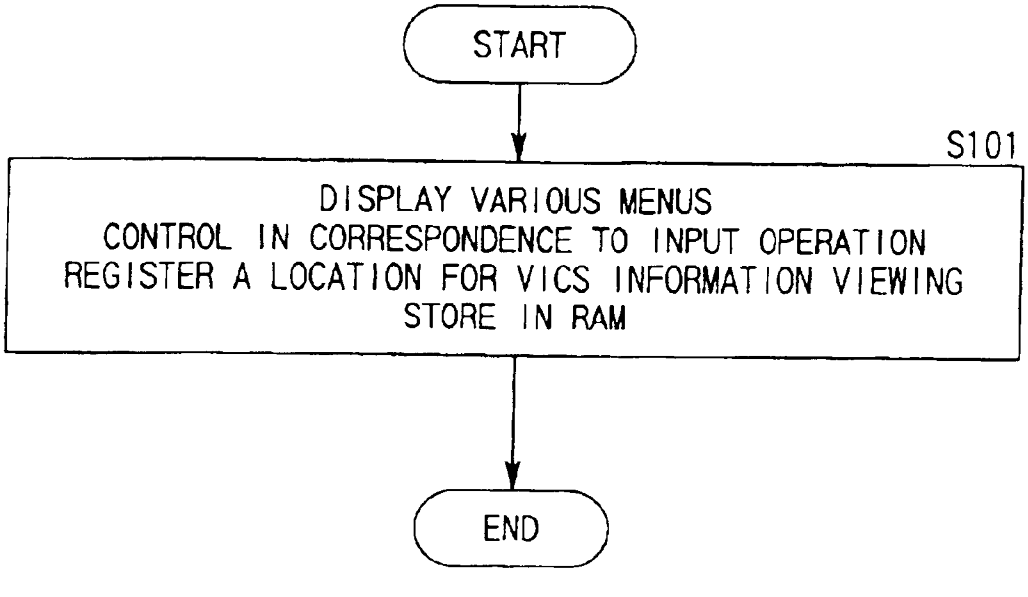
FIG. 4 shows a flowchart of the control implemented for the operation explained in reference to FIGS. 2A through 2D.

FIG. 4 is a flowchart of the control implemented by the control circuit 3 during the operation explained in reference to FIG. 2. In step S101, the control circuit 3 displays various menus and the like and implements various types of control in response to operations performed by the user through the input device 4. Then, ultimately, a location for which VICS information is to be obtained is registered and stored in the RAM 13. It is to be noted that the memory used for this purpose may be constituted of a non-volatile memory instead of the RAM 13. Alternatively, it may be constituted of a magnetic recording device such as a hard disk. Since details of the operation have already been explained in reference to FIG. 2, a detailed explanation of the control implemented by the control circuit 3 is omitted.

Figure 5:
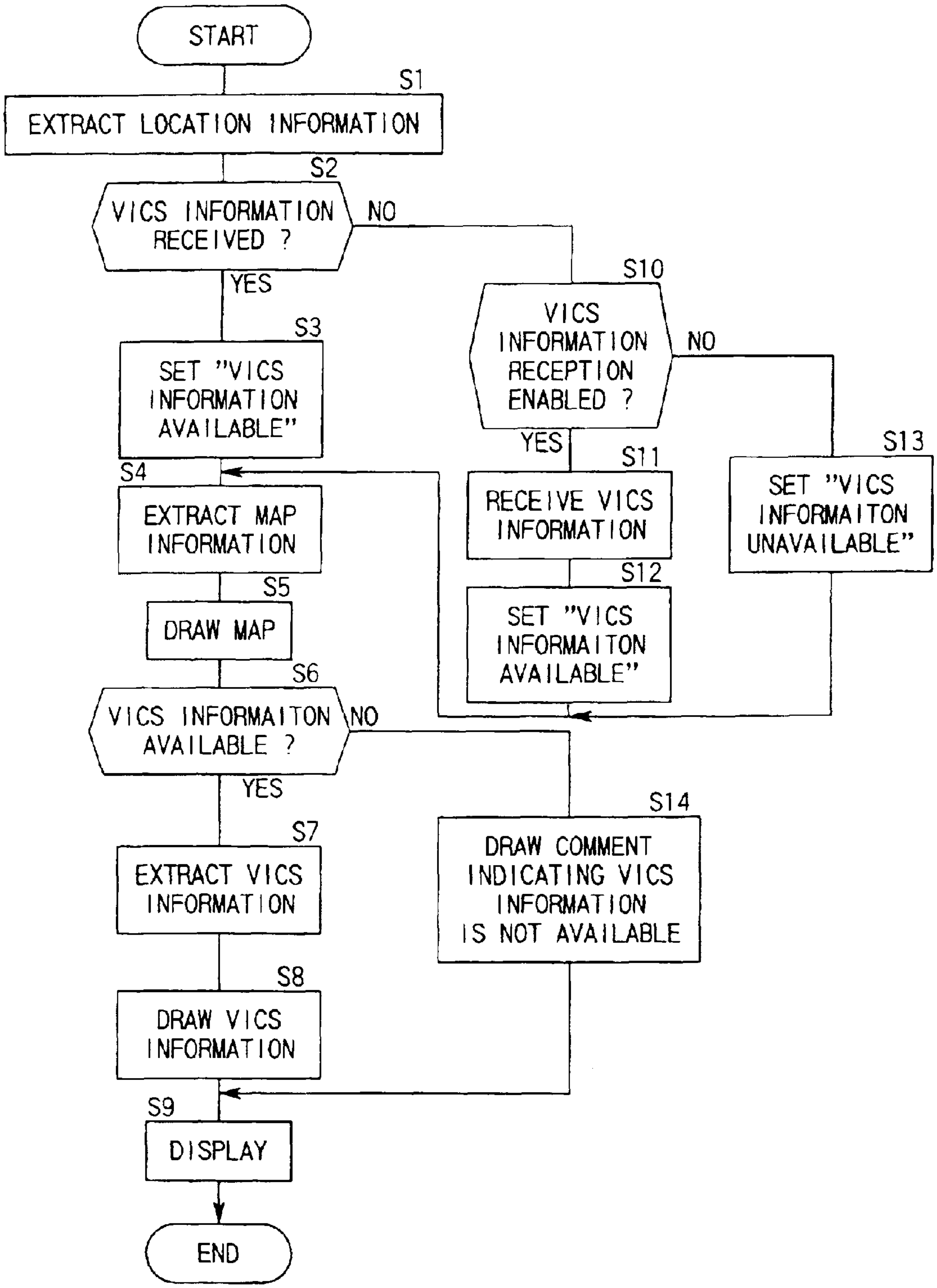
FIG. 5 shows a flowchart of the control implemented for the operation explained in reference to FIGS. 3A through 3C.

FIG. 5 is a flowchart of the control implemented by the control circuit 3 for the operation explained in reference to FIG. 3. The flowchart in FIG. 5 starts upon selecting and confirming one of the two locations registered in FIG. 3B.

In step S1, the location information with respect to the registered location selected and confirmed in FIG. 3B is extracted. For instance, this location information may be prefecture information. In step S2, a decision is made as to whether not the VICS information corresponding to the location has been received.

The embodiment is explained on the premise that the VICS information is transmitted through FM multiplex broadcast to be received by the FM multiplex broadcast reception device 9 in FIG. 1. In FM multiplex broadcast, one FM station is designated to provide FM multiplex broadcast of the VICS information in each prefecture, and the designated station broadcasts (transmits) the VICS information in the prefecture where the station is located. Thus, the FM multiplex broadcast reception device 9 of the car navigation apparatus is tuned to a specific FM station in the prefecture where the vehicle is currently located in conformance to the current vehicle position information detected by the current position detection device 1. The car navigation apparatus obtains the VICS information corresponding to the prefecture where the vehicle is currently located via the FM multiplex broadcast reception device 9.

The VICS information for the entire prefecture can be obtained over a cycle of approximately five minutes. Under normal circumstances the VICS information is received regularly while the power to the car navigation apparatus is in an ON state and, thus, the car navigation apparatus will have received all the VICS information for the single prefecture. For this reason, in the decision-making in step S2 as to whether or not the VICS information has been received, a decision is made as to whether or not the prefecture corresponding to the VICS information that has been received most recently matches the prefecture of the selected registered location.

If it is decided in step S2 that the VICS information has already been received, the operation proceeds to step S3 to set VICS information available (set the flag) In step S4, the map information corresponding to the area around the selected registered location is obtained from the map storage memory 2. In step S5, a map is drawn in the image memory 7 based upon the obtained map information. The map drawn in this step may be displayed as either a planimetric map or a bird's-eye-view map.

In step S6, a decision is made as to whether not "VICS Information Available" has been set. Since the "VICS Information Available" has been set in step S3, the operation proceeds to step S7. In step S7, the VICS information corresponding to the vicinity of the selected registered location is extracted before the operation proceeds to step S8. In step S8, VICS information is drawn at the image memory 7 over the map drawn in step S5 based upon the extracted VICS information. For instance, if traffic jam information is to be provided, a jammed road is indicated in red, a crowded road is indicated in yellow and a road with light traffic is indicated in green. Next, in step S9, the image data drawn in the image memory 7 is displayed at the display monitor 8.

If, on the other hand, it is decided in step S2 that VICS information has not been received, the operation proceeds to step S10. In step S10, the FM station tuning is switched based upon the location information on the selected registered location. For instance, if the vehicle is currently in Kanagawa Prefecture, the navigation apparatus has been tuned to FM Yokohama, which is the designated station for Kanagawa Prefecture. If the selected registered location, the VICS information for which the user wishes to display is in Tokyo, the navigation apparatus should be switched to tune to NHK FM, which is the designated station for Tokyo. After the tuning is switched, a decision is made as to whether not broadcast from the station can be received by checking the radio reception or the like. Under normal circumstances, broadcast from NHK FM can be received in Kanagawa Prefecture. It is to be noted that tuning switching is achieved by a circuit (not shown) internally provided at the FM multiplex broadcast reception device 9 in response to a signal from the control circuit 3.

If it is decided in step S10 that the VICS information can be received, the operation proceeds to step S11. In step S11, the VICS information corresponding to the selected registered location is received via the FM multiplex broadcast reception device 9, which has been switched to tune in the appropriate FM station. After the VICS information is received, the FM multiplex broadcast reception device 9 is tuned back to the original FM station. In step S12, the "VICS Information Available" is set ((flag is set) before the operation-proceeds to step S4. Subsequently, the processing in steps S4~S9 is performed to display the VICS information for the selected registered location at the display monitor 8.

It is to be noted that if it is decided in step S10 that the VICS information cannot be received, the operation proceeds to step S13. This occurs if it is decided that FM radio waves cannot be received due to poor radio reception. In such a case, the navigation apparatus is tuned back to the original FM station before the operation proceeds to step S13. In step S13, "VICS Information Unavailable" is set (flag is reset) before the operation proceeds to step S4. Under these circumstances, it is decided in step S6 that there is no VICS information before the operation proceeds to step S14. In step S14, a comment indicating that no VICS information is available is drawn in the image memory 7, so that the comments indicating that no VICS information is available is displayed together with the map of the vicinity of the selected registered location in step S9. In this case, no VICS information is displayed.

As described above, simply by specifying a pre-registered location, the VICS information corresponding to the registered location can be displayed. The specification in such a case may be made simply through a menu screen selection operation. Namely, it is not necessary to display VICS information by moving from the current vehicle position to a desired location through screen scrolling as in the prior art. Instead, the VICS information corresponding to the desired location can be promptly displayed through an extremely simple operation as if such display can be achieved through a single switch operation. This registered location can be regarded as a location different from the current vehicle position detected by the current position detection device. In addition, the VICS information display in this case is switched to the desired location at once, instantaneously and non-continuously instead of being continuously switched as in the scroll operation.

An explanation is given above in reference to the first embodiment on an example in which menu screens are selected using an input device such as a joystick. However, by providing touch switches such as a touch panel on the display screen, the VICS information corresponding to a desired location can be displayed with a single fingertip touch, to further facilitate the operation.

In addition, if VICS information is to be displayed for a location is in a prefecture other than the prefecture where the vehicle is currently located, the VICS information is obtained by tuning in the FM station designated for the prefecture. Thus, VICS information for an other prefecture and the like can be displayed.

Furthermore, the tuning can be also switched when moving the map display and the VICS information display through a screen scrolling operation. Namely, the navigation apparatus runs out of VICS information as the display crosses a prefectural border and, therefore, no VICS information is displayed when moving the map display and the VICS information display through a screen scrolling operation in the prior art. However, even when the screen scroll crosses over to the other side of a prefectural border, VICS information is supplied continuously by obtaining the VICS information corresponding to the other side position by switching the FM station tuning. This point will be explained again in reference to the third embodiment.

While an explanation is given in reference to the first embodiment on an example in which the VICS information is obtained through FM multiplex broadcast, the present invention may be adopted in a mode achieved by combining FM multiplex broadcast, light beacons and radio wave beacons. In addition, the number of locations that can be registered is not limited to two. Three or more locations may be specified for registration.

Second Embodiment

In the first embodiment, it is decided in step S10 in FIG. 5 that the VICS information cannot be received if the FM multiplex broadcast reception is low and the comment indicating that VICS information is unavailable is drawn and displayed in step S14. In the second embodiment, if the FM multiplex broadcast cannot be received, the VICS information is obtained through an information provider system that utilizes a portable telephone system (a cellular phone sustem).

Figure 6:
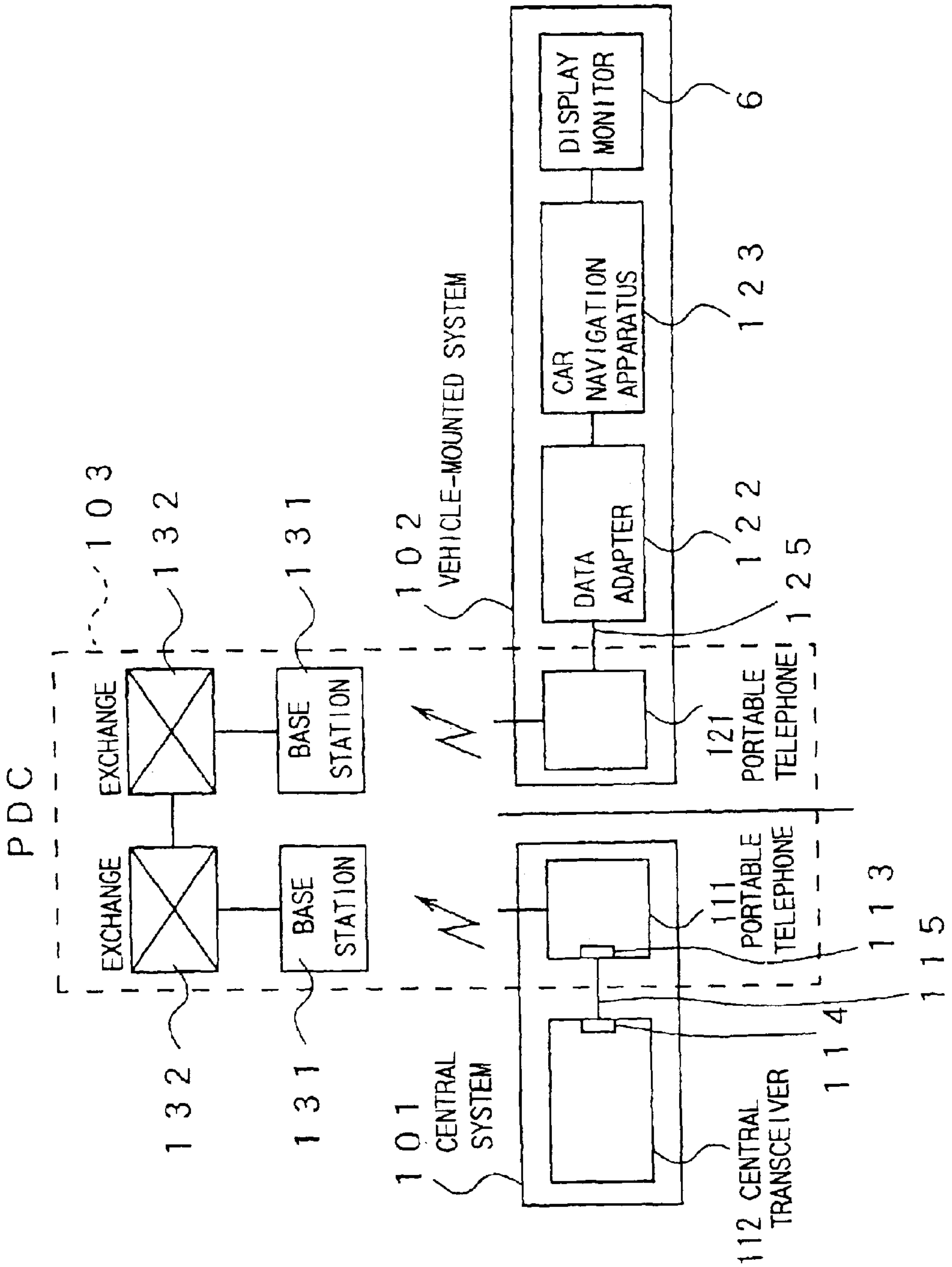
FIG. 6 shows the overall structure of an information provider system which includes a car navigation apparatus.

FIG. 6 illustrates the overall structure of an information provider system which includes the car navigation apparatus described earlier. Reference number 101 indicates a central system constituting the base for providing various types of information to users (customers). Reference number 102 indicates a vehicle-mounted system which is a user system for receiving the various types of information from the central system 101. Reference number 103 indicates an existing digital portable telephone system (PDC: Personal Digital Cellular Telecommunication System) utilized by this information provider system.

When a user requires various types of information retained at the central system 101, the user calls the central system 101 so that the information provider system can provide the user with the information through 9600 bps data communication supported by the digital portable telephone system 103. In addition, the user vehicle position information and the like transmitted by the vehicle-mounted system 102 to the central system 101 may be used as search information at the central system 101. Furthermore, the central system 101 may call the user to provide the user with information. The information provider system provides various services through such bidirectional communication, which are referred to as information providing services.

In the second embodiment, the central system 101 obtains VICS information corresponding to individual prefectures and provides a user with the VICS information for the prefecture requested by the user. The central system 101 is connected with the VICS center through wires or the like to obtain the VICS information corresponding to the individual prefectures.

The digital portable telephone system 103, which is achieved as a digital communication system, enables the user to make wireless telephone calls by using radio waves. The specifications including various protocols for the digital portable telephone system 103 are standardized in conformance to the "Personal Digital Cellular Telecommunication System Standard Specifications" RCR STD-27F, (or its latest revision) in Japan. Various digital portable telephone systems are provided by a plurality of operators in conformance to these specifications, and one of these digital portable telephone systems is utilized in this embodiment.

The central system 101 comprises a portable telephone mobile terminal 111 (a mobile telephone terminal, hereafter simply referred to as a portable telephone) and a central transceiver 112. The portable telephone 111 enables voice telephone calls (voice mode) and also enables digital data transmission/reception between computers or the like (data mode) This portable telephone 111 is a commercially available digital portable telephone. The central transceiver 112 is constituted of a computer system such as a personal computer, a workstation or a general-purpose computer, and although not shown, it can be connected with another computer system via the Internet, any of various personal computer communications systems, LAN (Local Area Network) or WAN (Wide Area Network). In this embodiment, it is connected with a system at the VICS center.

The portable telephone 111 is provided with a connector 113 for digital data transfer at its bottom. The central transceiver 112 is provided with an expansion board 114 which supports the digital portable telephone system, and the connector 113 and the expansion board 114 are connected with each other through a specific cable 115. When the cable 115 (the connector of the cable 115, to be more precise) is connected to the connector 113, the portable telephone 111 automatically enters the data mode. The central transceiver 112 constituted as a computer system internally executes a control program for the information provider system.

The vehicle-mounted system 102 comprises a portable telephone 121, a data adapter 122, a car navigation apparatus 123 and the display monitor 8 constituting part of the car navigation apparatus 123. The portable telephone 121 is similar to the portable telephone ill described earlier. The car navigation apparatus 123 is the car navigation apparatus described earlier. The control circuit 3 of the car navigation apparatus executes a program related to car navigation and also executes a control program related to signal exchange with the data adapter 122.

The data adapter 122 fulfills various functions as an interface in the data exchange between the portable telephone 121 and the car navigation apparatus 123. Its internal structure comprises a microprocessor and its peripheral circuits (not shown) to execute the various functions with the control program. The portable telephone 121, which is connected with a cable 125 as the portable telephone 111 is connected with the cable 115, is set in the data mode.

As described above, the digital portable telephone system 103 is an existing digital portable telephone system provided by a digital portable telephone operator and is constituted of base stations 131 engaged in wireless signal exchange with the portable telephones 111 and 121, exchanges 132 connected to the base stations 131 and also connected with one another to constitute a digital portable telephone network, and the like. It is to be noted that since the concept of the digital portable telephone system itself is of the known art, a detailed explanation is omitted.

Since the car navigation apparatus 123 is identical to the car navigation apparatus in the first embodiment, an explanation of its structure is omitted. In addition, an explanation of the control implemented to achieve VICS information display is omitted except for the difference from the control shown in FIG. 5, i.e., the control corresponding to step S13 in FIG. 5.

Figure 7:
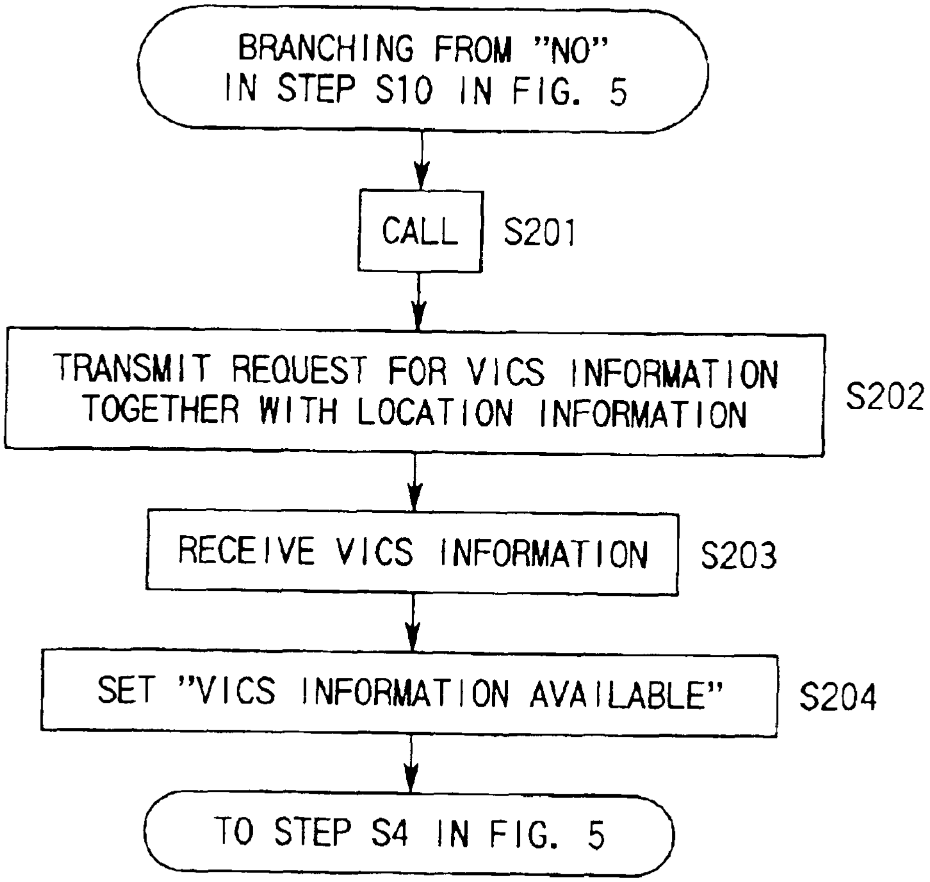
FIG. 7 shows a flowchart of procedural steps to replace step S13 in FIG. 5 corresponding to the first embodiment.

FIG. 7 is a flowchart of the control that replaces the control implemented in step S13 in FIG. 5 corresponding to the first embodiment.

If it is decided in step S10 in FIG. 5 that VICS information cannot be received through FM multiplex broadcast, the operation proceeds to step S201 in FIG. 7. In step S201, the car navigation apparatus 123 calls the central system 101 via the data adapter 122 and the portable telephone 121. When the call is connected, a message indicating that the VICS information is requested and the current position information are transmitted to the central system 101 in step S202. The central system 101 analyzes the data transmitted by the vehicle-mounted system 102, and transmits the VICS information corresponding to the prefecture that contains the specified location obtained from the VICS center to the vehicle-mounted system 102.

The car navigation apparatus 123 receives the VICS information transmitted by the central system 101 in step S203 and then the operation proceeds to step S204. In step S204, a "VICS Information Available" is set as in step S12 in FIG. 5 and the operation proceeds to step S4 in FIG. 5. Subsequently, processing is performed as in the first embodiment and the VICS information corresponding to the selected registered location is displayed at the display monitor 8.

As described above, even when the registered location for which the user wishes to display VICS information is at a great distance from the current vehicle position and the FM multiplex broadcast from the designated station for the location cannot be received, the VICS information can be displayed in the second embodiment.

Third Embodiment

In reference to the third embodiment, an example in which the VICS information for the prefecture across a prefectural border is obtained by switching the tuning of the FM broadcast station in advance as the vehicle is nearing the prefectural border. Since the car navigation apparatus is structured identically to that in FIG. 1 illustrating the first embodiment, its explanation is omitted. In addition, since the VICS information that has been obtained is displayed together with the map at the display monitor 8 through a method similar to that adopted in the first embodiment (see FIG. 5), its explanation is omitted. Thus, the following explanation will focus on the method of obtaining VICS information.

As explained earlier in reference to the first embodiment, one FM station is designated for each prefecture to provide the VICS information through FM multiplex broadcast, and the VICS information for the corresponding prefecture is broadcast (transmitted) from the designated station. There is a problem with a car navigation apparatus in the prior art in that when the vehicle is nearing a prefectural border, the VICS information for the prefecture across the border cannot be obtained and, thus, the VICS information display is interrupted at the prefectural border. The car navigation apparatus in the third embodiment provides a solution to this problem.

Figure 8:
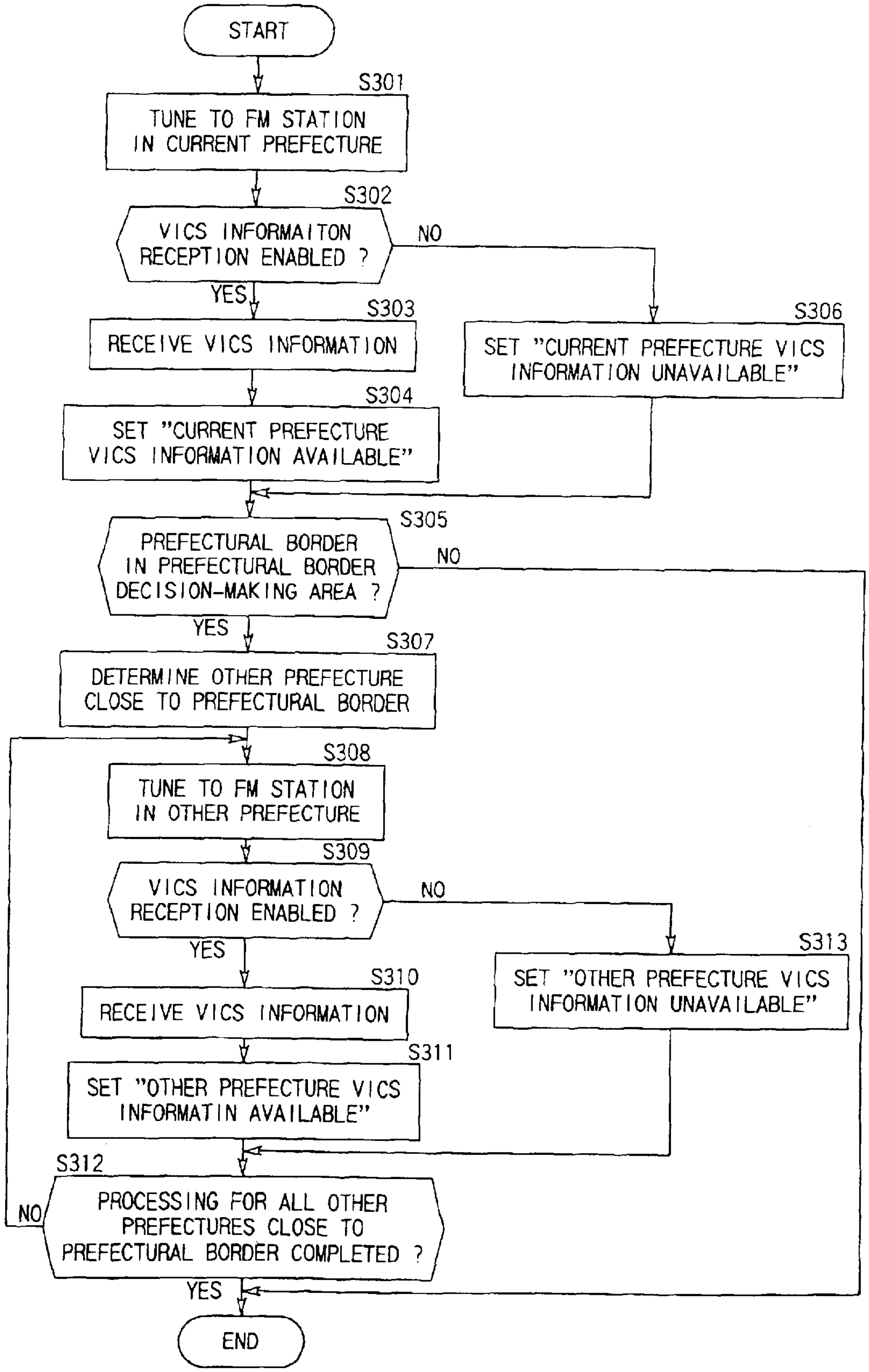
FIG. 8 shows a flowchart of the control implemented to obtain VICS information by automatically switching FM station tuning in the third embodiment.

FIG. 8 is a flowchart of the control implemented to obtain VICS information by automatically switching the FM station tuning. The control in this flowchart is activated over specific intervals (e.g., every five minutes) and is implemented by the control circuit 3.

In step S301, with the FM multiplex broadcast reception device 9 tuned to the FM station designated for the current prefecture based upon the current position of the vehicle detected by the current position detection device 1. The FM station designated for the current prefecture refers to the FM station designated for the prefecture where the vehicle is currently located. Information on the FM stations designated for various prefectures (frequencies and the like) is stored in the ROM 12 in advance. In step S302, a decision is made as to whether or not the broadcast from the station can be received based upon the radio reception and the like. If it is decided in step S302 that the VICS information from the FM station can be received, the operation proceeds to step S303. In step S303, the VICS information for the current prefecture is received via the FM multiplex broadcast reception device 9 and the data are stored in the RAM 13. It is to be noted that a plurality of areas are secured in the RAM 13 so that VICS information corresponding to a plurality of prefectures can be stored. For instance, areas to store information for three prefectures may be secured. In step S304, "Current Prefecture VICS Information Available" is set (flag is set) before the operation proceeds to step S305.

If it is decided in step S302 that the VICS information cannot be received, the operation proceeds to step S306. This occurs when it is decided that the radio reception is too poor to receive the FM radio waves. In step S306, "Current Prefecture VICS Information Unavailable" is set (flag is reset) before the operation proceeds to step S305.

In step S305, a decision is made as to whether or not the prefectural border is present within the prefectural border decision-making area. The prefectural border decision-making area refers to a range which is set in advance around the current vehicle position. For instance, it may be a 30-kilometer wide area centered on the current vehicle position. This prefectural border decision-making area moves as the vehicle travels. Prefectural border data are stored as road map data in the map storage memory 2. More specifically, the coordinates of the individual points of prefectural borders are stored as prefectural border data. In step S305, upon detection of the current vehicle position, the position is converted to coordinate values on a map and a decision is made as to whether or not any coordinate values in the prefectural border data are contained within a square area 30×30 kilometers around the current vehicle position.

If it is decided in step S305 that the 30 km area contains a prefectural border, the operation-proceeds to step S307. In step S307, the other prefecture close (or adjacent) to the prefectural border is determined as the prefecture for which VICS information should be obtained in advance. If there are a plurality of other prefectures close to the prefectural border, the plurality of prefectures are determined as prefectures the VICS information of which should be obtained in advance. In step S308, the tuning is switched to an FM station corresponding to one of the prefectures determined in step S307. It is to be noted that the tuning switching is implemented by a circuit (not shown) internally provided at the FM multiplex broadcast reception device 9 in response to a signal from the control circuit 3.

In step S309, a decision is made as to whether or not the broadcast from the FM station can be received based upon the radio reception or the like. If it is decided in step S309 that the VICS information can be received, the operation proceeds to step S310. In step S310, the VICS information of the other prefecture is received via the FM multiplex broadcast reception device 9 and the data are stored in the RAM 13. In step S311, "Other Prefecture VICS Information Available" is set (flag is set) before the operation proceeds to step S312.

If it is decided in step S309 that the VICS information cannot be received, the operation proceeds to step S313. This occurs when it is decided that the radio reception is poor to receive the FM radio waves. In step S313, "Other Prefecture VICS Information Unavailable" is set (flag is reset) before the operation proceeds to step S312. In step S312, the decision is made as to whether or not the processing for all the other prefectures determined in step S307 has been completed. If it is decided that there is an other prefecture the VICS information of which has not been obtained yet, the operation returns to step S308 to repeat the processing. If it is decided that the processing corresponding to all the other prefectures has been completed, the processing ends.

When the vehicle is nearing a prefectural border, the other prefecture beyond the prefectural border is identified in advance, a decision is made as to which prefecture's road traffic information is required and the FM station for the other prefecture is automatically tuned in to obtain the VICS information. Thus, the display of road traffic information such as the VICS information is not interrupted or broken off at a prefectural border. In addition, even while the vehicle is passing a prefectural border, smooth display of road traffic information is achieved.

It is to be noted that in the third embodiment, the processing proceeds by setting a flag indicating that reception is disabled if FM multiplex broadcast cannot be received, as in the first embodiment. However, the VICS information can be obtained through an information provider system utilizing a portable telephone system when FM multiplex broadcast cannot be received, as in the second embodiment.

In addition, while the prefectural border decision-making range is set as a 30-kilometer square centered on the current vehicle position in the third embodiment, the present invention is not limited to this example. For instance, the prefectural border decision-making area may be set over a circular range with a 15 kilometer radius. Furthermore, the prefectural border decision-making area may be limited to an area present along the direction in which the vehicle is advancing. The size of the prefectural border decision-making area is arbitrary. For instance, it may be an area 100×100 kilometers square. By expanding this range, road traffic information such as VICS information over a wide range can be obtained to enable display of road traffic information on a wide range map display. In other words, VICS information corresponding to a plurality of prefectures around the current vehicle position can be made available at all times while constantly updating the VICS information. By utilizing this in conjunction with the information provider system explained earlier, VICS information covering virtually the entire country can be obtained.

In addition, while the processing in FIG. 8 is started up approximately every five minutes in the third embodiment, the present invention is not limited to this example. For instance, the distance over which the vehicle has traveled may be detected by the vehicle speed sensor 1*b* to perform the processing in FIG. 8 each time the vehicle has traveled a specific distance (e.g., 1 km).

Moreover, the processing achieved in the third embodiment may be performed when scrolling the screen, as well. When the user operates the input device 4 to scroll the map display on the display monitor 8, a specific position on the screen (e.g., the center of the screen) may be considered to be equivalent to the current vehicle position in the processing in FIG. 8. Namely, while scrolling the screen, the coordinate values on the map corresponding to a specific position of the display screen at a given moment are calculated, and the prefectural border decision-making area over a specific range is set around these coordinate values. The prefectural border decision-making area may be set, for instance, over a range slightly larger than the range of the map displayed on the screen.

As a result, when a prefectural border is about to be displayed on the screen during a scroll operation, it is possible to predict that the road traffic information for the prefecture beyond the prefectural border will be required and to determine which prefecture's road traffic information will be required. Accordingly, the FM station designated for the other prefecture is tuned in to obtain the VICS information corresponding to the other prefecture in advance, and the VICS information corresponding to the prefecture beyond the prefectural border is displayed without interruption while the prefectural border starts to appear on the display through a scroll operation.

Fourth Embodiment

In the third embodiment, a decision is made as to whether or not there is a prefectural border present within the prefectural border decision-making area around the current vehicle position as the vehicle is nearing a prefectural border to predict the area (prefecture) for which VICS information will be required. While guiding the vehicle on the route selected through a route search, the VICS information of another prefecture on the route is obtained in advance in the fourth embodiment. As in the third embodiment, the structure of the car navigation apparatus employed in the fourth embodiment is identical to that in FIG. 1 illustrating the first embodiment, and therefore, its explanation is omitted. In addition, since the method employed to display the obtained VICS information together with the map on the display monitor 8, too, is identical to that in the first embodiment (see FIG. 5), its explanation is omitted.

Figure 9:
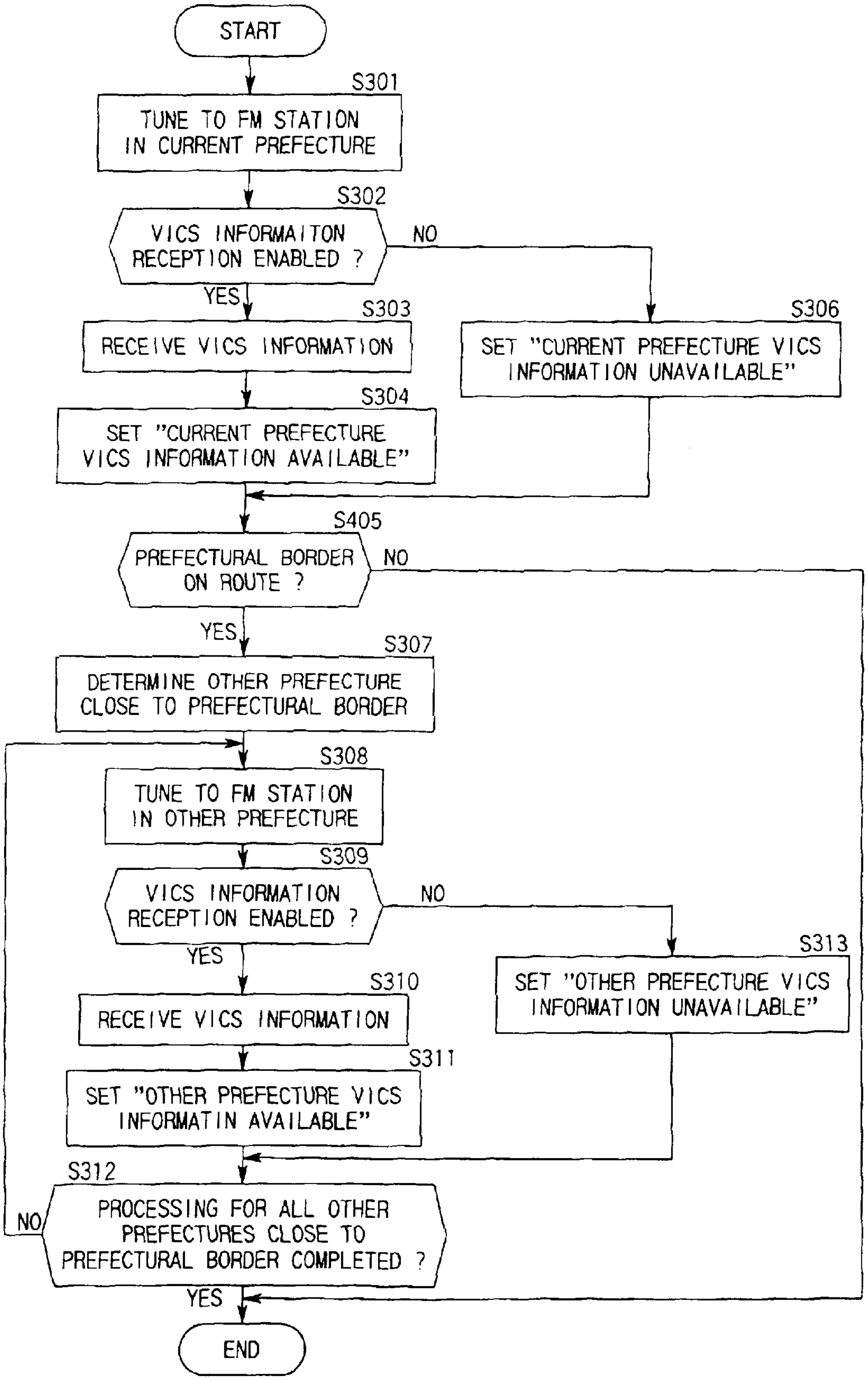
FIG. 9 shows a flowchart of the control implemented to obtain VICS information by automatically switching FM station tuning in the fourth embodiment.

FIG. 9 is a flowchart of the control implemented to obtain VICS information by automatically switching the FM station tuning. Since the flowchart in FIG. 9 is identical to the flowchart in FIG. 8 except for the control implemented in step S305, the explanation below will focus on the difference and repeated explanation is omitted.

After the VICS information for the current prefecture is obtained in steps S301~S304, the operation proceeds to step S405. In step S405, a decision is made as to whether or not there is a prefectural border present on the route selected through the route search. The range over which the decision is made as to whether or not the prefectural border is present on the route is a specific range along the advancing direction of the vehicle from the current position toward the destination. Prefectural border data are stored as road map data in the map storage memory 2, in which coordinate data indicating individual points of prefectural borders are stored as prefectural border data. Since points at each of which a prefectural border and a road intersect are stored as the prefectural border data, a decision is made as to whether or not coordinate values of the roads on the route selected through route search include any coordinate values matching the prefectural border data. While various other algorithms may be used to make the decision as to whether or not a road on the route passes a prefectural border, any of those other algorithms may be used in this process.

If it is decided in step S401 that a prefectural border is present on the route, the operation proceeds to step S307. In step S307, the other prefecture close to the prefectural border is determined as the prefecture the VICS information of which is to be an obtained in advance and, as in the third embodiment, the VICS information for the other prefecture is obtained in steps S308~S313.

When the vehicle is nearing a prefectural border, the other prefecture beyond the prefectural border is identified in advance and the FM station for the other prefecture is automatically tuned in to obtain the VICS information. Thus, the display of road traffic information such as the VICS information is not interrupted at the prefectural border. In addition, even while the vehicle is passing a prefectural border, a smooth display of road traffic information is achieved.

In the fourth embodiment, the VICS information can be obtained through an information provider system utilizing a portable telephone system when FM multiplex broadcast cannot be received, as in the second embodiment.

In addition, while the area over which the decision is made as to whether or not a prefectural border is present on the route is set over a specific range, the decision-making area may cover the entire range of extending from the current vehicle position to the destination. In this case, the VICS information corresponding to the entire range extending from the start point to the destination can be obtained for display. Implemented in conjunction with the information provider system explained earlier, this will enable the user to view the VICS information corresponding to the entire route even when the destination is far away and there is a prefecture on the route from which FM multiplex broadcast cannot be received.

Furthermore, while an explanation is given in reference to the fourth embodiment on an example in which a decision is made as to whether or not a prefectural border is present on the route selected through the route search, the implementation of the fourth embodiment is not limited to an application in a vehicle traveling on a route selected through a route search. For instance, the details of the fourth embodiment may be adopted when the vehicle is traveling on an expressway or a no-through (unforked) road instead of a route selected through a route search, since a specific traveling route is taken when the vehicle is traveling on an expressway or a no-through road just as when it is traveling on a route selected through a route search.

It is to be noted that while an explanation is given in reference to the first through fourth embodiments on an example in which the VICS information is displayed at the display monitor, VICS information may be provided audibly instead.

Moreover, while an explanation is given above in reference to the first through fourth embodiments on an example in which VICS information is provided through FM multiplex broadcast, the VICS information may be provided through a means other than FM multiplex broadcast. For instance, VICS information may be provided through another type of radio broadcast such as AM broadcast or shortwave broadcast, as long as multiplex broadcast of digital data is possible. The present invention may be achieved through television broadcast as well. In other words, the present invention may be adopted in each instance in which digital data can be transmitted using electrical waves transmitted through radio broadcast or television broadcast.

While an explanation is given in reference to the second embodiment on an example in which if the FM multiplex broadcast cannot be received, the VICS information is obtained through an information provider system that utilizes a portable telephone system. However, the present invention may be adopted in a case that the VICS information is obtained through this information provider system from the beginning. Moreover, the present invention may be adopted in a case that the VICS information is obtained through Internet that utilizes a portable telephone system.

While an explanation is given in reference to the first through fourth embodiments on an example in which VICS information is displayed on a car navigation apparatus, the present invention is not limited to application in a car navigation apparatus. For instance, it may be adopted to display VICS information in a system for taxi dispatch or the like. In other words, it can be adopted in all types of apparatuses that display or voice output road traffic information such as VICS information.

Furthermore, while an explanation is given above in reference to the first through fourth embodiments on an example in which the present invention is adopted in the Vehicle Traffic Information Communication System (VICS) that is currently employed to provide road traffic information in Japan, the present invention is not limited to application in this system. It may be adopted in any system that provides road traffic information. Moreover, the present invention may be adopted in other road traffic information communication systems similar to VICS that are employed in various foreign countries. The present invention may be adopted in the RDS-TMC (Radio Data System—Traffic Message Channel) that are employed in Europe and the U.S.A. for example.

While an explanation is given in reference to the first~fourth embodiments in which VICS information is provided in units of individual administrative districts such as prefectures, the present invention is not limited to the application realized in conjunction with the prefectural units. The present invention may be implemented in conjunction with the units of area set by the VICS center. In cases of the other road traffic information communication systems operated in various foreign countries, the present invention may be implemented in conjunction with the units of area set by the other road traffic information communication systems. In other words, areas over which road traffic information is provided by the individual designated radio stations constitute the units of division.

In addition, while the control program executed by the control circuit 3 in the car navigation apparatus is stored in the ROM 12 in the first~fourth embodiments explained above, the present invention is not limited to these particulars. The control program and the installation program may be provided in a recording medium such as a CD-ROM 14.

Figure 10:
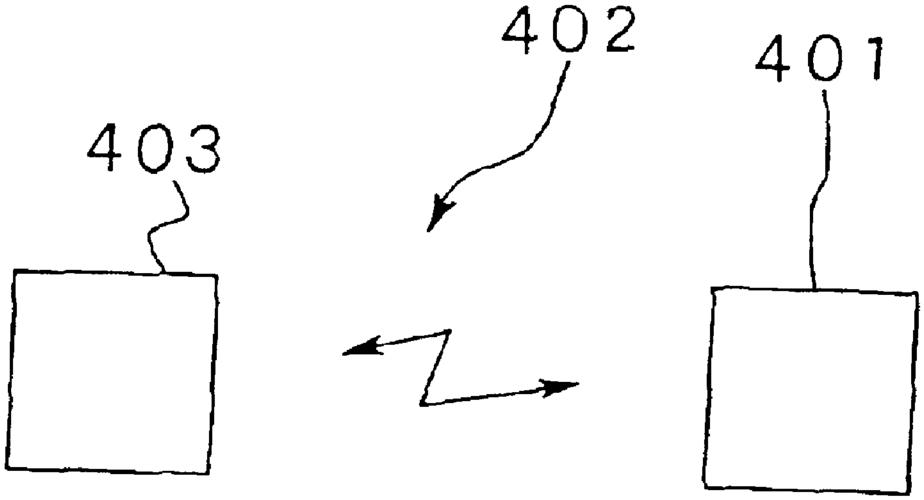
FIG. 10 illustrates that a program is provided via a transmission medium.

Furthermore, these programs may be provided via a transmission medium such as a telecommunication line, a typical example of which is the internet. In other words, the programs may be converted to signals transmitted on a carrier wave that carries a transmission medium. FIG. 10 illustrates how this may be achieved. A car navigation apparatus 401, which is the car navigation apparatus explained earlier, has a function of connecting with a telecommunication line 402. A computer 403 is a server computer in which the control program to be provided to control the car navigation apparatus 401 is stored. The telecommunication line 402 may be a telecommunication line for connection with the Internet, for personal computer communication or the like or it may be a dedicated telecommunication line. A telecommunication line 402 is a telephone line or a wireless telephone line such as a line for a portable telephone.

It is to be noted that the car navigation apparatus may be realized by having the control program described above executed on a personal computer. In such a case, the current position detection device 1, the FM multiplex broadcast reception device 9 and the like may be connected to specific I/O ports or the like of the personal computer.

What is claimed is:

1. A road traffic information provider system, comprising:

an information provider system that provides road traffic information via wireless communication; and a navigation apparatus that comprises an information obtaining device which obtains road traffic information provided from the information provider system, a road traffic information obtaining device which obtains road traffic information provided via at least one of radio broadcast and light beacons and radio wave beacons, and a display control device which controls to display road traffic information obtained by the information obtaining device and the road traffic information obtaining device on a display device, wherein:

the navigation apparatus further comprises a decision-making device that makes a decision whether or not road traffic information is obtained by the information obtaining device;

the information obtaining device of the navigation apparatus transmits information related to a request of road traffic information to the information provider system when the decision-making device has made a decision that road traffic information is obtained by the information obtaining device; and the information provider system provides road traffic information to the navigation apparatus in response to the information related to the request transmitted from the information obtaining device of the navigation apparatus.

2. A road traffic information provider system according to claim 1, wherein:

the decision-making device of the navigation apparatus makes a decision that desired road traffic information is obtained by the information obtaining device in case that the desired road traffic information can not be obtained by the road traffic information obtaining device.

3. A road traffic information provider system according to claim 1, wherein:

the information provider system provides road traffic information of a substantially entire country.

4. A road traffic information provider system according to claim 1, wherein:

the wireless communication comprises a data communication supported by a portable telephone system.

5. A navigation apparatus comprising:

a road traffic information obtaining device which obtains road traffic information provided via at least one of radio broadcast and light beacons and radio wave beacons;

an information obtaining device which obtains road traffic information provided via wireless communication from an information provider system;

a display control device which controls to display road traffic information obtained by the road traffic information obtaining device and the information obtaining device on a display device;

a decision-making device that makes a decision whether or not road traffic information is obtained by the information obtaining device, wherein the information obtaining device transmits information related to a request of road traffic information to the information provider system when the decision-making device has made a decision that road traffic information is obtained by the information obtaining device, and obtains road traffic information provided from the information provider system in response to the information related to the request.

6. An information provider system comprising:

a computer that provides road traffic information in response to information related to a request of road traffic information from a navigation apparatus that comprises:

a road traffic information obtaining device which obtains road traffic information provided via at least one of radio broadcast and light beacons and radio wave beacons;

an information obtaining device which obtains road traffic information provided via wireless communication from the information provider system;

a display control device which controls to display road traffic information obtained by the road traffic information obtaining device and the information obtaining device on a display device; and a decision-making device that makes a decision whether or not road traffic information is obtained by the information obtaining device, and wherein the computer provides the road traffic information in response to the information related to the request of road traffic information from the navigation apparatus, when the information obtaining device of the navigation apparatus transmits the information related to the request of road traffic information to the information provider system in case that the decision-making device has made a decision that road traffic information is obtained by the information obtaining device.

* * * * *